(12) United States Patent
Gehlot

(10) Patent No.: US 6,377,377 B1
(45) Date of Patent: Apr. 23, 2002

(54) APPARATUS AND METHOD FOR REDUCING PHASE MODULATED GAIN FLUCTUATIONS IN OPTICAL COMMUNICATIONS SYSTEMS AND NETWORKS

(75) Inventor: Narayan L. Gehlot, Sayerville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/197,403

(22) Filed: Nov. 20, 1998

(51) Int. Cl.[7] .............................................. H04B 10/00
(52) U.S. Cl. ...................... 359/154; 359/173; 359/180; 359/181
(58) Field of Search ................................. 359/154, 173, 359/180, 181, 183, 188

(56) References Cited

U.S. PATENT DOCUMENTS

| | | | | |
|---|---|---|---|---|
| 5,339,183 A | * | 8/1994 | Suzuki | 359/181 X |
| 5,373,382 A | * | 12/1994 | Pirio et al. | 359/181 X |
| 5,872,647 A | * | 2/1999 | Taga et al. | 359/183 X |
| 6,072,615 A | * | 6/2000 | Mamyshev | 359/183 |
| 6,163,394 A | * | 12/2000 | Webb | 359/181 |
| 6,198,559 B1 | * | 3/2001 | Gehlot | 359/181 X |

* cited by examiner

Primary Examiner—Thomas Mullen

(57) ABSTRACT

The present invention is a transmitter device and related system and method for use in high speed optical transmission systems. In one exemplary embodiment of the present invention, light from a laser diode power output is split into two branches of substantially equal power. At least a first optical modulator, for example a phase modulator, receives light from the first branch and modulates URZ data from a URZ coder thereon. The modulator, which may also be second optical modulator receives light from the laser diode on the second branch and modulates delayed data ($URZ_d$) representative of the URZ data from the URZ coder thereon. The net delay at the receiver in the delayed $URZ_d$ data is preferably T/2, where T is a pulse period of URZ data. The first and second sets of data originating from the first and second branches of the transmitter, respectively, are uniquely added together at the transmitter, fiber or receiver in order to realize UNRZ data. With dispersive optical fiber cable between the transmitter and receiver these signals encounter propagation delays and arrive at the receiver separately. An advantage of the present invention is that bit pattern dependent gain fluctuations in individual optical amplifiers across multiple dense wavelengths are eliminated because of the transmission of constant envelopes.

22 Claims, 2 Drawing Sheets

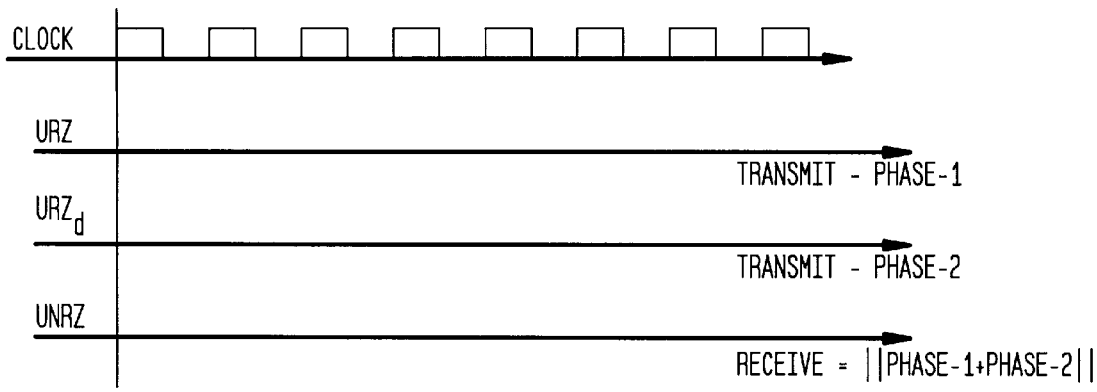
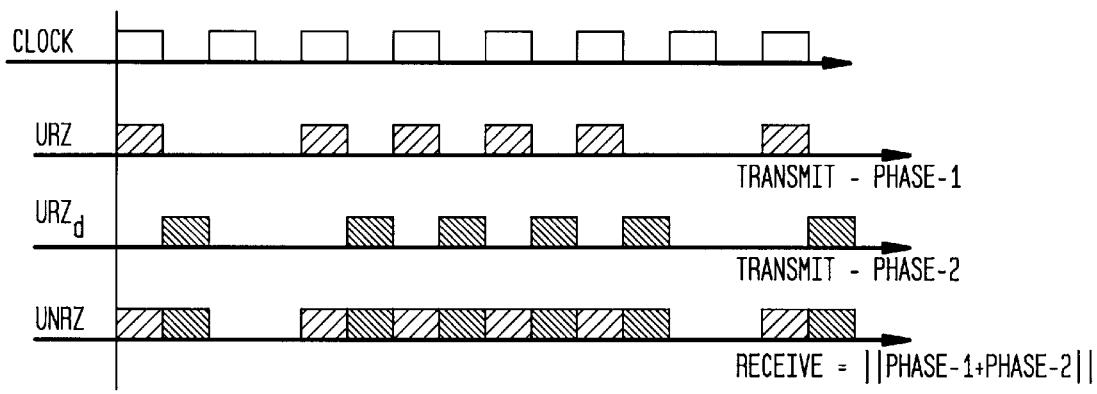
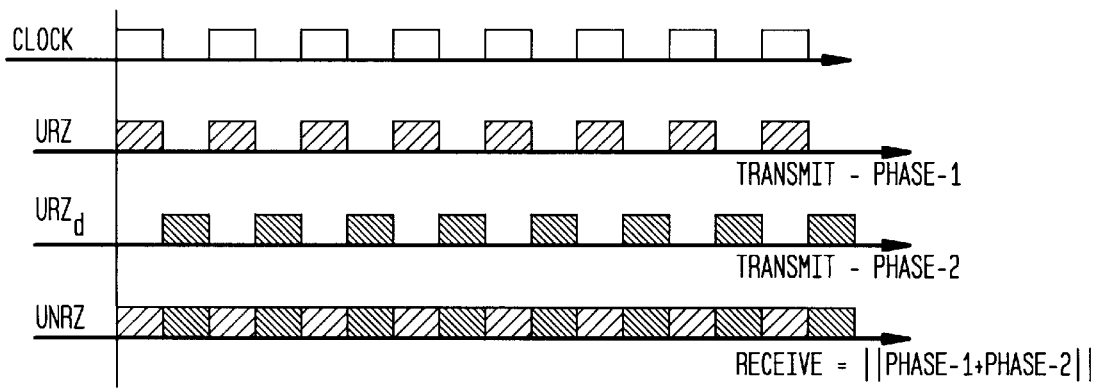

APPARATUS AND METHOD FOR REDUCING PHASE MODULATED GAIN FLUCTUATIONS IN OPTICAL COMMUNICATIONS SYSTEMS AND NETWORKS

RELATED APPLICATIONS

This application is related to co-pending U.S. patent application Ser. No. 09/197,823 entitled SYSTEM AND METHOD FOR GENERATING NRZ SIGNALS FROM RZ SIGNALS IN COMMUNICATIONS NETWORKS (Gehlot-7), now U.S. Pat. No. 6,055,283 and co-pending U.S. patent application Ser. No. 09/197,071 entitled AUTOMATIC DELAY COMPENSATION FOR GENERATING NRZ SIGNALS FROM RZ SIGNALS IN COMMUNICATIONS NETWORKS (Gehlot-9), now U.S. Pat. No. 6,198,559, those applications having a common inventor and assignee with the instant application, and being incorporated herein by reference.

FIELD OF INVENTION

The present invention relates generally to the field of high speed optical communication and more particularly to high speed optical transmission systems utilizing dense wave division multiplexing (DWDM) and other like transmission schemes.

BACKGROUND OF INVENTION

In optical communications systems or optical networks utilizing dense wave division multiplexing (DWDM) and other optical transmission schemes, a laser diode is used to convert electrical signals to optical pulses for transmission over fiber optic cable. To a certain extent, most laser diodes have one or more of the following drawbacks when used for optical transmission, even without data modulation being applied: 1) Random optical amplitude fluctuations referred to as relative intensity noise (RIN) amplitude; 2) Random optical phase fluctuations, where the optical phase noise is also related to optical frequency noise; and 3) Random polarization fluctuations which result because of random polarization phase changes or individual random amplitude changes of polarization states or both.

In addition to the above drawbacks, when a laser diode is directly modulated, i.e., the laser diode current is changed in accordance with the digital data to be transmitted, the optical power output (RIN) and optical frequency change randomly, producing what is termed chirp. As is understood by those skilled in the art, chirp broadens the output spectrum of the laser diode. That is, the linewidth of the laser diode is broadened and thus additional optical frequencies are present at the transmitter. As a result of chirp, transmission distances are shortened and data rates are reduced. Furthermore, optical power limitations may be imposed to limit significant energy utilized as a result of the additional frequencies which are present because of chirp. As would be understood, chirp will depend on modulation waveform types, such as, square wave (maximum chirp), triangular wave, and sinusoidal wave (minimum chirp).

In addition to the above limitations which are present with the laser diode when used in connection with high speed optical communications, the fiber optic cable as used in the transmission introduces certain impairments into the data due to the non-linearities in the fiberoptic cable itself. As would be understood, the impairments may include dispersion, self phase modulation (SPM), cross phase modulation (XPM), four wave modulation FWM, optical channel gain fluctuations in optical amplifiers due to bit patterns, etc.

The high speed optical communications which takes place within the optical systems and networks utilizing the laser diodes and fiberoptic cable may be transmitted using any one of a number of transmission coding schemes. Unipolar return-to-zero (URZ) and unipolar no-return-to-zero (UNRZ) schemes are commonly used in optical data transmission because of their unipolar characteristics. Since laser power is either zero or a certain positive quantity, only unipolar encoding can be implemented in fiber optical communication systems. UNRZ is a widely used optical communication technique for laser modulation in optical communications because of its low bandwidth requirement as compared to URZ. URZ offers some advantages when used in fiberoptic systems with optical amplifiers; however, this use is at the cost of higher bandwidth.

High speed optical transmitters in the prior art have adopted one or the other coding scheme depending on a particular application and the amount of resources available, e.g., power, bandwidth, etc. The above discussed drawbacks and limitations associated with laser diodes and the corresponding optical networks are present, however, regardless of which of the coding schemes is utilized.

Accordingly, there is a need in the art for an optical transmitting device which combines advantages with respect to transmission of both the URZ and UNRZ coding schemes, while at the same time eliminating those limitations and impairments found in prior art laser diodes and optical networks.

SUMMARY OF TIE INVENTION

The present invention is a transmitter device and related system and method for use in high speed optical transmission systems. In one exemplary embodiment of the present invention, light from a laser diode power output is split into two branches of substantially equal power. A first optical modulator, for example a phase modulator, receives light from the first branch and modulates URZ data from a URZ coder thereon. A second optical modulator receives light from the laser diode on the second branch and modulates delayed data ($URZ_d$) representative of the URZ data from the URZ coder thereon. The net delay at the receiver in the delayed $URZ_d$ data is preferably T/2, where T is a pulse period of URZ data. The first and second sets of data originating from the first and second branches of the transmitter, respectively, are uniquely added together at the transmitter, fiber or receiver in order to realize UNRZ data. With dispersive optical fiber cable between the transmitter and receiver these signals encounter propagation delays and arrive at the receiver separately. By changing the optical delay in one or the other or both arms of the receiver or other location, the dispersion effect is compensated for without using costly high dispersion fiber which may require expensive optical amplifiers for additional gain or other like methods to control dispersion. An advantage of the present invention is that bit pattern dependent gain fluctuations in individual optical amplifiers across multiple dense wavelengths are eliminated because of the transmission of constant envelopes. Also the transmitted spectrum is compact which significantly reduces XPM and SPM as both optical and electrical harmonics are reduced to a minimum. A further advantage of the present invention is that the overall bandwidth of the transmitted data is the same as UNRZ. Although described as including a first and second modulator, it would be understood that a single modulator and/or a single channel from the optical source could also be utilized.

BRIEF DESCRIPTION OF THE DRAWINGS

For a better understanding of the present invention, reference may be had to the following description of exemplary embodiments thereof, considered in conjunction with the accompanying drawings, in which:

FIG. 2 shows a graphical representation of the addition of URZ and $URZ_d$ signals which are added together to produce UNRZ data.

DETAILED DESCRIPTION

Figure 1:
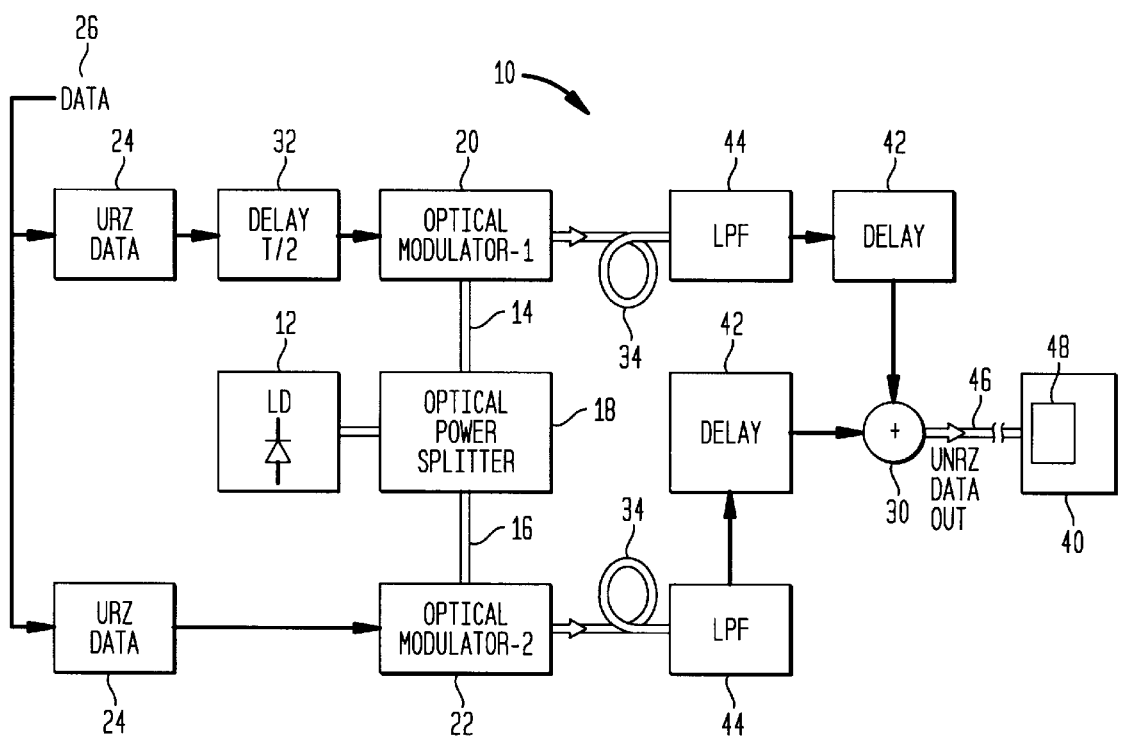
FIG. 1 shows an exemplary embodiment of an optical transmitter in accordance with the present invention.

The present invention is an apparatus and method for use as, or with, a high speed optical transmitter, and which reduces the optical power penalty incurred due to dispersion and other limiting factors associated with optical envelope, optical amplifiers and non-linearities of fiberoptic channels. In order to achieve such an improvement in optical power penalty, the present invention takes advantage of a unique hybrid coding scheme which enables two occurrences of identical URZ data to be transmitted (one occurrence ($URZ_d$) being delayed by a given amount) where the two transmissions are later combined to produce UNRZ data. As is explained more fully in co-pending U.S. patent application Ser. No. 09/197,823 entitled "SYSTEM AND METHOD FOR GENERATING NRZ SIGNALS FROM RZ SIGNALS IN COMMUNICATIONS NETWORKS" (Gehlot-7), now U.S. Pat. No. 6,055,283, which is incorporated herein by reference, this hybrid coding scheme has significant advantages over the prior art in that it is an efficient way to receive UNRZ data by transmitting URZ coded data. This is significant in that URZ coded data has properties that favor optical transmission and it is therefore desirable to be able to transmit URZ data instead of UNRZ data and still be able to realize the benefits of receiving UNRZ data.

Referring to FIG. 1, an exemplary optical transmitter is shown in accordance with the present invention. The transmitter 10 includes at least a laser diode 12. As shown, the light produced from the laser diode is split into a first branch 14 and a second branch 16 of substantially equal power using one or more conventional optical splitters 18. Light from the first branch 14 is input to a first optical modulator 20, for example, a phase modulator where URZ data from data coder 24 (and corresponding data source 26) is phase modulated, using for example, binary phase shift keying (BPSK). Light from the second branch 16 of the transmitter is input to a second optical modulator 22 using the same technique as that of the first optical modulator 20. The second optical modulator 22 modulates light from the second branch 16 with the identical URZ data (which was input to the first modulator), with the exception that the data input to the first modulator is delayed ($URZ_d$) in signal delay element 32 by a given amount to obtain $URZ_d$. Preferably, the net delay in the exemplary embodiment at the receiver is T/2, where T is the period of a URZ pulse, however, it would be understood that other delays are also permissible.

As shown, the signals are next combined at the transmitter 10 in a conventional combiner 30 in order to be transmitted over a single optical medium, for example, a fiber optic cable. At least one optical delay 34 is used in each leg of the transmitter 10, between the modulator and the combiner in order that the signals may combine properly at the receiver, for example, to produce the required UNRZ data. It would also be understood that besides receiver 40, the signals may also be combined at the transmitter or fiber channel 46 in order to realize UNRZ data. As would also be understood, the optical delay is a function of the path propagation, wavelength and fiber type. At this point the phase between the two sets of URZ data may be adjusted automatically at the receiver as is disclosed in detail by related co-pending application Ser. No. 09/197,071, entitled Automatic Delay Compensation for Generating NRZ Signals from RZ Signals in Communications Networks (Gehlot-9), now U.S. Pat. No. 6,198,559, the disclosure of which is incorporated herein by reference.

Note that the delay provided by signal delay element 32 as shown in the figure is normally an electrical delay. Additional optical delay elements 34 are also shown in each optical pathway. It would be understood, that additional electrical delay elements may also be placed within one or more of the optical pathways. As shown in FIG. 1, exemplary additional electrical delay elements 42 are shown proximate the combiner 30 and subsequent to filters 44, for example, low pass filters, which may also be included in one or more of the optical paths. The combination of electrical delay elements and optical delay elements are cooperatively adjusted to assure that delay of the $URZ_d$ coded signal relative to the URZ coded signal, as received at the receiver, is maintained at approximately one-half of the period of the system clock (or else one half the period of URZ pulse). It should, however, be recognized that, while the exemplary embodiment of the invention incorporates a combination of separate electrical and optical delay elements, the required delay may also be provided in a single delay element which may be optical or electrical. Other combinations of delay elements may also be established to achieve the desired goal of a delay of the $URZ_d$ signal relative to the URZ signal at the receiver 40(which includes a decoder 48).

In the absence of any optical fiber cable between the transmitter 10 and receiver 40 (referred to as a back to back connection of transmitter and receiver) UNRZ data is recovered by adding the two URZ signals externally or within the optical field. With dispersive optical fiber cable between the transmitter and receiver the first and second data signals (corresponding to the modulated light signals on the first and second branch) each encounter propagation delays and arrive at the receiver separately in a single fiber single wavelength, or more than one fiber single wavelength. By changing the optical (or electrical) delay in one or the other or both of either two channels on the same fiber of the receiver 40, the dispersion effect can be compensated without using costly high dispersion fiber with optical amplifiers other like methods to control dispersion. As mentioned previously, it would be understood that the optical delay is a function of path propagation, wavelength and fiber type, where the optical delay can be adjusted for example by altering the length of the fiber optic cable or other similar methods using high (±) dispersion passive/active optics.

The transmitter of FIG. 1 may also perform the modulation by way of continuous phase frequency shift keying (CPFSK) for constant envelope transmission. The modulated signals are then combined and transmitted in a similar manner to that already discussed.

Referring to FIGS. 2A, 2B and 2C, there are shown a series of exemplary data transmissions of URZ and $URZ_d$ by a transmitter in accordance with the present invention. As can be seen, the URZ and $URZ_d$ are combined at the transmitter, receiver or along the optical path in order to realize the UNRZ data.

In general, the present invention is advantageous in that the optical power penalty incurred because of dispersion, SPM, XPM, FWM, WDM channel gain fluctuations due to bit pattern and other inherent limitations present in most laser diodes, are significantly reduced. This optical power penalty is reduced, since a constant envelope of signal is now being transmitted. The receiver data rate is always the same as conventional UNRZ.

The present invention is unique in that a first set of data is modulated with URZ data and the second set of data is modulated with $URZ_d$ data at the transmitter to eventually obtain UNRZ data at the receiver. Thus, different coding is being used at the optical modulator of the transmitter relative to the optical receiver. The present invention is also unique in that a digital data clock or digital data clock harmonics (low or high) are not being used to modulate the optical frequency, optical phase or optical polarization. The present invention also does not modulate the optical frequency of the laser diode prior to data modulation.

The present invention thus provides a unique methodology to enable the receipt of UNRZ data through the transmission of URZ and $URZ_d$ data, where the URZ coded data has properties that favor optical transmission mediums and optical amplifiers relative to UNRZ. A simple and efficient method is also presented for controlling dispersion. SPM and XPM are eliminated due to less harmonics and WDM channel gain fluctuation is reduced because of the transmission of a constant envelope. As explained, the present invention also eliminates the need for expensive dispersion control fiber, while at the same time eliminating the need for bulk optics in order to provide dispersion compensation. In addition, the need for variable dispersion compensation per channel in DWDM is eliminated. Further, manual tracking which is usually needed for dispersion compensation in the prior art is no longer needed in that it can be automated as explained in related co-pending application entitled Automatic Delay Compensation for Generating NRZ Signals form RZ Signals in Communications Networks (Gehlot-9), which has been incorporated by reference.

From the above, it should be understood that the embodiments described, in regard to the drawings, are merely exemplary and that a person skilled in the art may make variations and modifications to the shown embodiments without departing from the spirit and scope of the invention. For example, the present invention transmitter, transmitter receiver system and related coding scheme although described with respect to an optical communications system may also be utilized in wireless, modem, cable television and data networks or any other communication system or chip-to-chip communication within a chip or on circuit boards. Also, although described as including a first and second modulator, it would be understood that a single modulator and/or a single channel from the optical source could also be utilized. All such variations and modifications are intended to be included within the scope of the invention as defined in the appended claims.

I claim:

1. A transmitter device for transmitting optical data, said device comprising
   a modulator for receiving a light input from an optical source and modulating first coded data from a coder coupled thereto on said light input, said modulator further modulating delayed first coded data on said light input, said modulator generating a constant envelope output signal for said first coded data and said delayed first coded data;
   at least one output port coupled to said modulator for transmission of said output signal therefrom.

2. The device of claim 1, wherein said light input is split into a first and second branch, said first branch being coupled to a first modulator for generating said first coded data and said second branch coupled to a second modulator for generating said delayed first coded data.

3. The device of claim 1, wherein said constant envelope includes a constant amplitude.

4. The device of claim 1, wherein said at least one modulator is a binary phase shift keying (BPSK) modulator.

5. The device of claim 1, wherein said at least one modulator is a continuous phase frequency shift keying (CPFSK) modulator.

6. The device of claim 1, wherein said constant envelope output signal enables reduction of bit pattern dependent gain fluctuations.

7. The device of claim 6, wherein said bit pattern dependent gain fluctuations include SPM and XPM.

8. The device of claim 1, wherein said first coded data is URZ data and said delayed first coded data is delayed URZ data.

9. The device of claim 8, wherein said URZ data and said delayed URZ data are combinable into UNRZ data.

10. The device of claim 1, wherein said first coded data and said delayed first coded data are combined at a location selected from the transmitter device, an optical fiber channel and a receiver.

11. The device of claim 10, wherein a net delay of said delayed first coded data to be received at a location to be decoded is T/2, where T is a period of a first coded data pulse.

12. The device of claim 11, wherein said delay is produced from a delay element selected from the group consisting of electrical delay element, optical delay element and a combination of electrical and optical delay element.

13. The device of claim 11, wherein delay elements for producing said delay are at a location selected from the group consisting of: transmitter, fiber optic channel and receiver.

14. The device of claim 1, wherein the length of an optical medium over which said output signal is transmitted is adjustable to compensate for dispersion effects.

15. A system including a transmitter device for transmitting data and a receiver for receiving said data, said system comprising
   a transmitter including,
   a modulator for receiving a light input from an optical source and modulating first coded data from a coder coupled thereto on said light input, said modulator further modulating delayed first coded data on said light input, said modulator generating a constant envelope output signal for said first coded data and said delayed first coded data;
   at least one output port coupled to said modulator for transmission of said output signal therefrom; and
   a receiver including,
   at least one input for receiving said first coded data and said delayed first coded data, said receiver including a decoder for decoding and translating said first coded data and said delayed first coded data received from said transmitter into a second data type.

16. The system of claim 15, wherein said light input is split into a first and second branch, said first branch being coupled to a first modulator for generating said first coded data and said second branch coupled to a second modulator for generating said delayed first coded data.

17. The system of claim 15, wherein said first coded data is URZ data and said delayed first coded data is delayed URZ data.

18. The system of claim 17, wherein said URZ data and said delayed URZ data are combinable into UNRZ data.

19. The system of claim 15, wherein a net delay of said delayed first coded data to be received at a location to be decoded is T/2, where T is a period of a first coded data pulse.

20. A method of transmitting optical data, said method comprising the steps of:

receiving a light input from an optical source and modulating first coded data from a coder coupled to said optical source on said light input;

further modulating delayed first coded data on said light input with a modulator, said modulator generating a constant envelope output signal for said first coded data and said delayed first coded data;

transmitting said first coded data and said delayed first coded data over an optical medium.

21. The method of claim 20, wherein said first coded data is URZ data and said delayed first coded data is delayed URZ data and said URZ data and said delayed URZ data are combinable into UNRZ data.

22. The method of claim 21, wherein a net optimum end-to-end delay from a transmitter to a receiver of said delayed URZ signal is T/2, where T is a period of a URZ data.

* * * * *